(12) United States Patent
Karin et al.

(10) Patent No.: US 11,196,746 B2
(45) Date of Patent: Dec. 7, 2021

(54) WHITELISTING OF TRUSTED ACCESSORS TO RESTRICTED WEB PAGES

(71) Applicant: MICROSOFT TECHNOLOGY LICENSING, LLC, Redmond, WA (US)

(72) Inventors: Omer Karin, Tel Aviv (IL); Hani Hana Neuvirth, Redmond, WA (US); Dotan Patrich, Rishon (IL); Tomer Koren, Tel Aviv (IL); Ram Haim Pliskin, Rishon (IL); Josef Weizman, Haifa (IL); Yotam Livny, Gardera (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 503 days.

(21) Appl. No.: 16/027,304

(22) Filed: Jul. 4, 2018

(65) Prior Publication Data
US 2020/0014697 A1    Jan. 9, 2020

(51) Int. Cl.
*H04L 29/06* (2006.01)
*G06N 20/00* (2019.01)

(52) U.S. Cl.
CPC .......... *H04L 63/101* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,794,278 | B1* | 10/2017 | Leita | G06N 7/005 |
| 10,643,149 | B2* | 5/2020 | Kukehalli Subramanya | H04L 61/305 |
| 10,701,097 | B2* | 6/2020 | Madou | G06F 21/54 |
| 10,880,270 | B1* | 12/2020 | Rigor | H04L 63/1425 |
| 10,956,561 | B2* | 3/2021 | Chopra | G06F 21/552 |
| 2008/0034424 | A1* | 2/2008 | Overcash | H04L 63/1416 726/22 |
| 2008/0034425 | A1* | 2/2008 | Overcash | H04L 63/1425 726/22 |
| 2012/0124372 | A1* | 5/2012 | Dilley | H04L 63/0471 713/162 |
| 2015/0067848 | A1* | 3/2015 | Baikalov | H04L 63/1416 726/23 |
| 2015/0121532 | A1* | 4/2015 | Barel | G06F 21/577 726/25 |
| 2016/0359809 | A1* | 12/2016 | Phonsa | H04L 63/0263 |
| 2017/0019421 | A1* | 1/2017 | Hebert | H04L 63/1408 |
| 2017/0093918 | A1* | 3/2017 | Banerjee | H04L 63/20 |
| 2018/0139222 | A1* | 5/2018 | Wan | H04L 63/1458 |

(Continued)

*Primary Examiner* — Jeffery L Williams
(74) *Attorney, Agent, or Firm* — Rainier Patents, P.S (57) ABSTRACT

"Sensitive" URIs for a website can be determined. Access attempts to a sensitive URI can be extracted from server logs. As used herein, sensitive URIs are URIs which if breached are likely to result in harm to the website owner. Access to sensitive URIs can be restricted to trusted accessors. Trusted accessors can be determined by filtering out untrusted accessors using thresholds and/or machine learning techniques. After filtering out untrusted accessors, any remaining accessors can be identified as trusted accessors. Trusted accessors can be added to a whitelist. Access requests to access-restricted URIs by an accessor not in the whitelist can be denied and an alert can be generated. Access requests to access-restricted URIs by an accessor in the whitelist can be granted.

20 Claims, 6 Drawing Sheets

(56) References Cited

U.S. PATENT DOCUMENTS

2018/0288086 A1* 10/2018 Amiri .................. G06F 40/126
2020/0014697 A1* 1/2020 Karin ..................... G06N 20/00
2020/0204527 A1* 6/2020 Vass ....................... G06Q 20/12

* cited by examiner

WHITELISTING OF TRUSTED ACCESSORS TO RESTRICTED WEB PAGES

BACKGROUND

A computer system that provides services, especially a system connected to a public network, is often the subject of attack. The purpose of the attack may be to gain unauthorized access to the service, to disrupt the service, to corrupt or steal data or to accomplish various other malicious deeds. Gaining access to some URIs (uniform resource identifiers) by a malicious actor can have more potential for harm than gaining access to other URIs.

SUMMARY

"Sensitive" Uniform Resource Identifiers (URIs) can be determined. As used herein, sensitive URIs are URIs which if accessed by unauthorized accessors can result in harm to the owner of the website with which the URI is associated. Access attempts to a sensitive URI can be extracted from historical data regarding access requests to many websites. Access to sensitive URIs can be restricted to trusted accessors of a particular website. That is, the knowledge gained from many access requests to many websites can be harnessed to provide enhanced protection for an individual website. Trusted accessors can be determined by filtering out untrusted accessors from historical data using thresholds and/or machine learning techniques, and so on. After filtering out untrusted accessors, any remaining accessors can be identified as trusted accessors. Trusted accessors for a website can be added to a whitelist for that website. Access requests to access-restricted URIs by an accessor not in the whitelist can be optionally denied. An alert can be optionally generated. Access requests to access-restricted URIs by an accessor in the whitelist can be granted.

Sensitive URIs can be designated as sensitive by a human manually adding URIs to a data store of sensitive URIs. URIs can be determined to be sensitive by AI (artificial intelligence) by learning which webpages in many websites tend to be scanned by remote entities that are performing scanning or that are making brute force attacks on the URI, by those URIs that require username and password, by URIs that are well-known configuration sites and so on. URIs can be determined to be sensitive by a combination of manual and AI techniques. URIs that are determined to have access attempts from many remote entities can be filtered out. The programmatically-determined sensitive URIs can be added to the data store of sensitive URIs.

Access to sensitive URIs for a website can be restricted to trusted accessors for that website where a trusted accessor is identified by the presence of its identifier (e.g., IP address) in a whitelist for the website. Untrusted accessors can be determined manually and can be manually removed from the whitelist. Untrusted accessors can be determined by AI by learning which accessors are likely to be scanners. For example, historical data for many websites using the perspective of access attempts to many machines can be analyzed to identify potentially malicious external computing devices by identifying an external computer that uses the same attack methodology on multiple targets, performs fast crawling, generates numerous error status codes that are returned to a particular requestor and so on. Such accessors are possible or potentially likely to be malicious actors and therefore untrusted. Untrusted accessors can be filtered out of the collection of potentially trusted accessors extracted from the historical data.

Of the remaining IP addresses in the collection of potentially trusted accessors, the accessors that accessed the URI for at least a configured number of days during the learning period can be designated as trusted and can be placed in the whitelist of trusted IP addresses. If an access attempt made to a restricted URI originates from an accessor in the whitelist (trusted), access can be granted. When an access attempt is made to a restricted URI from an accessor not in the whitelist (not trusted), access can be optionally denied. An alert can be optionally generated when an access attempt is made from an accessor who is not in the whitelist.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Cyber attacks are a great concern for website operators. Because websites often allow remote administration, they are susceptible to breach, either by password theft or by brute force attack. One way to protect websites from these attacks is to only allow access from trusted IPs. This is challenging, however, since manually configuring which page should be access-restricted, and which IPs are trusted, is a cumbersome and mistake-prone process.

In contrast, as described more fully below, the subject matter disclosed herein can programmatically determine which URIs are sensitive (and to which access should be restricted to trusted accessors) and which accessors can be trusted and therefore allowed to access the access-restricted URI. A URI can be determined to be sensitive manually. URIs can be determined to be sensitive by AI by learning which pages tend to be scanned by remote entities that are performing scanning or that are making brute force attacks on the URI. URIs can be determined to be sensitive by a combination of manual and AI techniques. Sensitive URIs can be stored in a data store of sensitive URIs or otherwise marked as sensitive.

To determine trusted accessors, all access attempts made during a machine learning (ML) phase of a ML system to sensitive URIs (website pages) can be extracted from historical data such as but not limited to server logs. Accessors can be identified by their Internet Protocol or IP address. An IP address is a numerical label that identifies a device connected to a computer network that uses the Internet Protocol for communication. Trusted accessors can be determined manually. Trusted accessors can be determined by AI by learning which accessors are likely to be scanners. Trusted accessors can be determined by filtering out untrusted accessors from a collection of potentially trusted accessors using thresholds and/or machine learning techniques. After filtering out untrusted accessors, any remaining accessors can be identified as trusted accessors. Trusted accessors can be added to a whitelist. Access requests to access-restricted URIs by an accessor not in the whitelist can be denied and an alert can be generated. Access requests to access-restricted URIs by an accessor in the whitelist can be granted.

Historical data such as server logs from multiple server logs associated with multiple web applications can be analyzed to identify an external computer that uses the same attack methodology on multiple targets. For example, the external computer may attempt to access the same Uniform Resource Identifier (URI) on various web sites. This type of attacker typically exhibits a pattern of crawling to the same web page on many different web sites, searching for a particular vulnerability. In many cases, the http status code that is returned is an error code because the requested page does not exist or because security software blocks the request. The security software may block the request because it determines that the requestor is likely to be a malicious or nefarious actor because of the quantity of similar requests made by the same computer. When the requested page does not exist, an http error status code in the 400s is typically returned, indicating that an error appears to have been made by the requestor in the http request.

Characteristics such as but not limited to crawling to a particular web page but not doing anything there (called fast crawling) and numerous error status codes being returned to a particular requestor can be used by a machine learning (ML) system to identify potentially malicious external computing devices and/or sensitive URIs. An alert can be raised for an application that returns a valid response to the potential attacker (e.g., when an http status code of 200 is returned to the requestor). Sensitive URIs tend to be scanned by remote entities that are performing scanning or that are making brute force attacks on the URI. Access attempts from an accessor determined to be a scanner or from an accessor that is making a brute force attack can be filtered out. URIs that are determined to have access attempts from many remote entities can be filtered out. Of the remaining accessors in the collection of potentially trusted accessors that accessed the sensitive URI for at least a configured number of days during the learning period can be tagged as trusted and can be placed in the whitelist of trusted accessors for the website. If an access attempt is made to a restricted-access URI, if the access attempt originates from an accessor in the whitelist (trusted), access can be granted. When an access attempt is made to a restricted URI from an accessor not in the whitelist (not trusted), access can be optionally denied. An alert can be optionally generated when an access attempt is made from an accessor that is not in the whitelist.

Hence, a machine learning (ML) system as disclosed herein can detect sensitive URIs and can eliminate untrustworthy accessors from a collection of potentially trusted accessors. By using server logs from different web applications, external devices that apply the same type of attack on multiple web applications can be identified, etc., providing a more comprehensive perspective of untrustworthy accessors and sensitive URIs.

Typical behavioral patterns associated with a particular type of attack can be identified because the attacker may be searching for a particular vulnerability. For example, an attacker may access the same URI prefix on multiple websites looking for a particular vulnerability. Thus, fast crawling to the same web page on many different web sites is a behavioral pattern associated with the type of attack that exploits the vulnerability associated with the URI. Fast crawling refers to a behavior in which, unlike a human who navigates to a page to perform some action (such as to buy a book on Amazon.com), a script executes that navigates to URI after URI without initiating further actions associated with the location. Often the http status code returned indicates an error because the requested page does not exist on some of the attacked websites. Often the request will be blocked by existing security software because the security software has detected that many access attempts to the page were made by the attacker. Hence, many http status codes indicating that the URI does not exist is a behavioral pattern associated with an attack. The machine learning system can identify malicious external IPs, and/or sensitive URIs, and raise alerts, for example, for those customers that return a valid response to the attacker (e.g., http status code=200).

Machine learning enables computers to use existing data to forecast future behaviors, outcomes, and trends. Using machine learning, computers "learn" without being explicitly programmed. In machine learning systems, typically there is a training phase and a prediction phase. In supervised machine learning, a number of training examples or data points associated with particular outcomes are provided to the machine learning system. The machine learning system finds relationships between patterns in the training data and the outcomes. Supervised machine learning systems are trained with labeled data. Labeled data is data comprised of examples of the answers wanted. For example, a model that identifies fraudulent credit card use may be trained from a data set in which known fraudulent transactions are labeled "fraudulent" and transactions known to be legitimate are labeled "legitimate". In the training phase, the computer system determines underlying commonalities among the fraudulent transactions and underlying commonalities among the legitimate transactions so that the trained system can predict whether a received transaction is likely to be fraudulent or legitimate. Typically, the labeled training data is divided into two groups of transactions, one of which is used to train the ML system and the other of which is used to evaluate the prediction accuracy of the trained ML system. Once the machine learning system has been trained to achieve a particular level of accuracy, the trained system can be used to make predictions.

A Uniform Resource Identifier (URI) is a string of characters that identifies a resource. A URI enables interaction with the resource over a network. A common type of URI is the Uniform Resource Locator (URL), or web address, that provides a method for finding the resource by specifying both an access mechanism and network location. For example, the URL http://example.org/website/Main_Page refers to a resource identified as /website/Main_Page whose representation, in the form of HTML and related code, is obtainable via the http protocol from a network host whose domain name is example.org.

In accordance with aspects of the subject matter disclosed herein, known sensitive URIs can be labeled "sensitive". The set of known sensitive URIs used can be or can include the set of URIs provided by the Open Web Application Security Project (OWASP) at https://github.com/Spider-Labs/owasp-modsecurity-crs/tree/v3.0/master/rules). All other URIs can be labeled "non-sensitive". For each requestor, the number of different web sites on which the requestor accessed a URI can be calculated. The URI accessed the greatest number of times on the greatest number of different web sites can be labeled the "top URI". If the top URI is a sensitive URI, the computing device that accessed it can be labeled as malicious or untrusted if the computing device accessed that URI on more than a specified number of websites (e.g., if computing device accessed the URI on more than 5 different websites.) Computing devices that do not fit these criteria are labeled non-malicious. Computing devices whose top URI is not in the sensitive list can be labeled non-malicious. Computing devices that accessed its top URI on more than a specified quantity (e.g., 500 or 1000, etc.) websites within the analyzed hour can be labeled non-malicious because a URI that is accessed extremely frequently is more likely to be a particularly popular site rather than a site that is under attack or sensitive.

A feature characterizes some aspect correlated with the label (e.g., malicious or trusted computing device for the IP ML system, sensitive or not sensitive URI for the URI ML system.) A feature is a property on which predictions are based. The selected features of the ML system encapsulate the behavior of accessing a small number of URIs over many different web sites, returning many unsuccessful http status codes. In accordance with some aspects of the subject matter described herein, the features selected by the ML system can include one or more of: port scanning patterns, http response status codes, entropy of the character distribution of the web site names, existence of a referrer page and the user-agent of the http request. In the prediction phase, the URI information is not used (as it is not one of the selected features). For each entry in the server's log for which an http status of 200 is returned (i.e., a successful request), the IP ML system can predict if the external computing device that initiated the request is malicious or not malicious. The URI ML system can predict if the accessed URI is vulnerable (sensitive) or not vulnerable. If the scores returned by each ML system exceed a specified threshold or threshold, an alert can be generated. The alert can be made available to the owner of the web application.

Whitelisting of Trusted Accessors to Restricted Web Pages

Figure 1A:
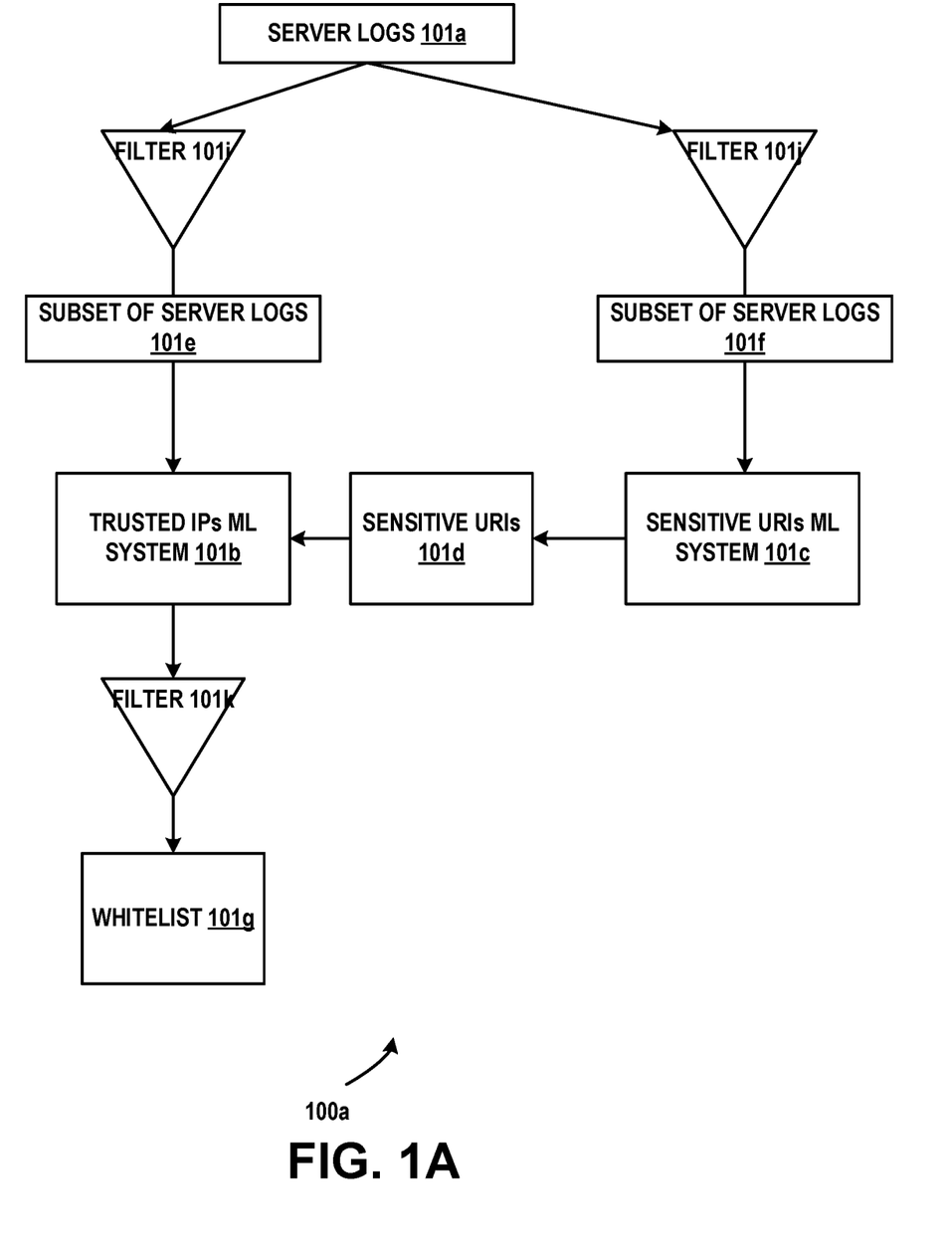
FIG. 1A is a block diagram 100a representing an architectural overview of a system that restricts access to sensitive URIs in accordance with aspects of the subject matter disclosed herein.

FIG. 1A is a block diagram representing an architectural overview 100a in accordance with aspects of the subject matter described herein. Historical data such as but not limited to server logs such as server logs 101a can be all the server logs or some portion of the server logs received at one or more computers (e.g., web servers) for all the websites or web applications or for some portion thereof which can be hosted on one or more computers (e.g., web servers). The server logs can include access requests (e.g., http requests) for a quantity of web applications hosted on web servers. Each entry in a server log can represent an interaction between an external computer identified by its IP address and a website in which the computer identified by the IP address accesses a page of a website hosted on the one or more computers (e.g., web servers). The entry can include the path to the computer that the external computing device originating the access request accessed.

Each server log entry may include an interaction of a requestor with a page of a website and can include one or more of the following bits of information: the URI accessed (the parameters associated with the accessed URI may be excluded), the accessor (client) identifier (e.g., the identifier may be an obfuscated identifier such as the IP address of the computing device issuing the access request, e.g., 123.45.67.000), the access request status (e.g., an http request code such as a code in the 400s indicating an invalid request or a code such as http status code 200 indicating a valid request, etc.), a user agent, and/or referring URI.

The server logs can be analyzed and used to train (teach) and evaluate an ML system that identifies sensitive URIs such as sensitive URIs ML system 101c. An entry in the server log that is extracted from the server log during the training phase can be an entry in which an attempt is made to access a particular URI that appears in a list of high-risk keywords of Unix-shell, that uses a restricted-use file used by open source web application firewalls or is identified by the Open Web Application Security Project (OWASP), an online community that produces articles, methodologies, documentation, tools, and technologies in the field of web application security. An entry in a server log that is extracted from the server logs can be an entry that includes certain words such as "admin" or "login", etc., or that requires the use of a username or password to access the URI. Any URI meeting these criteria can be included in a collection of sensitive URIs for a particular collection of URIs associated with a website. In general, a sensitive URI is a URI which if accessed by an unauthorized accessor can result in harm to the owner of the website. Filter 101j can extract a subset of server logs 101f from server logs 101a. The extracted entries can be used by the sensitive URIs ML system such as sensitive URIs ML system 101c to generate a collection of sensitive URIs such as collection of sensitive URIs 101d.

Server log entries extracted (filtered out by filter 101i) from the server logs 101a creating a subset of server logs 101e to train and evaluate the trusted IPs ML system 101b can be those access requests that attempt to access URIs in the collection of sensitive URIs 101d generated by the sensitive URIs ML system 101c. The extracted server log entries for the trusted IPs ML system 101b can be those server logs filtered out of the subset of server logs 101e by a filter such as filter 101k to eliminate access requests from an accessor that accessed more than a provided accessor threshold quantity of URIs during the training (learning) period. The extracted server log entries can be filtered by a classifier. A classifier in ML maps input data into categories to eliminate accessors, typically using labeled data, that analyzes how many different computing machines, subscriber entities, etc. tried to access an access-restricted URI, accessed more than a provided accessor threshold quantity of URIs during the training (learning) period. If the number of access requests originating from a particular accessor to a sensitive URI exceeds a specified threshold, the accessor can be removed from the collection of potentially trusted accessors. URIs can be removed from the collection of potentially sensitive URIs in response to determining that access requests exceed a threshold number of access requests. Requestors that only access sensitive URIs on a single day or on less than a configurable number of days can be removed from the collection of potentially trusted IPs by filter 101k. The remaining accessor/URI interactions in the server log for a website can be tagged as trusted accessor/URI interactions for the website. Trusted accessors can be placed in a whitelist 101g.

Feature extraction refers to developing derived values (features) that facilitate subsequent learning and generalization. Feature extraction reduces a large amount of data suspected to be redundant in nature to a smaller set of features (a feature vector). Determining a subset of the initial features is called feature selection. The selected features are expected to include the relevant information from the input data, so that the desired task can be performed by using this reduced representation instead of the complete set of initial data.

Figure 1B:
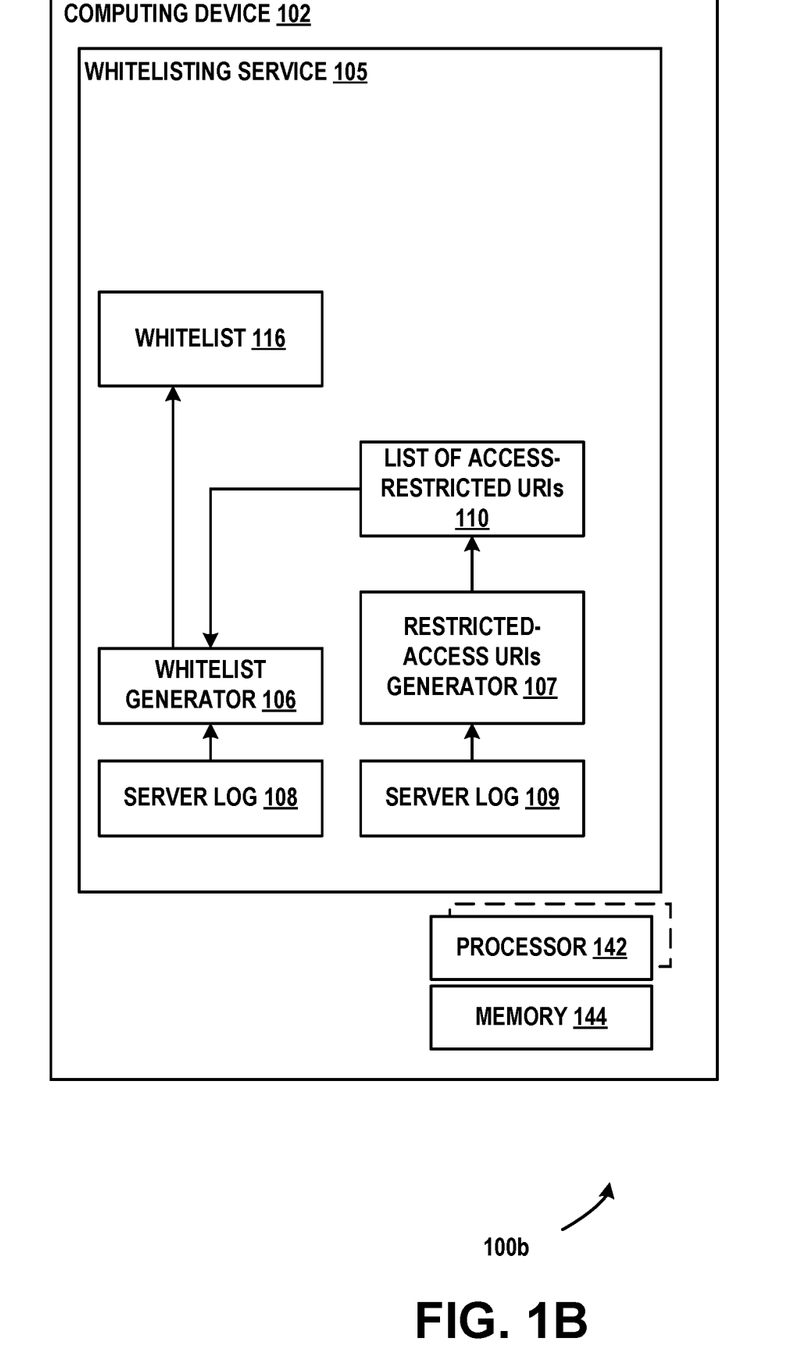
FIG. 1B is a block diagram 100b representing a system that restricts access to sensitive URIs in accordance with aspects of the subject matter disclosed herein.

FIG. 1B is a block diagram representing a system 100*b* for restricting access to sensitive URIs in accordance with aspects of the subject matter disclosed herein. All or portions of system 100*b* may reside on one or more computers or computing devices such as the computers described below with respect to FIG. 3. System 100*b* or portions thereof may be provided as a stand-alone system or as a plug-in or add-in. System 100*b* or portions thereof may include information obtained from a service (e.g., in the cloud) or may operate in a cloud computing environment. Cloud computing enables access to shared pools of configurable system resources. It can also provide various services that can be set up rapidly with little effort. Sharing of resources provides economies of scale.

Cloud computing enables an entity to focus on its actual business instead of having to provide its own computer infrastructure and maintenance. A cloud computing environment can be an environment in which computing services are not owned but are provided on demand. For example, information may reside on multiple devices in a networked cloud and/or data can be stored on multiple devices within the cloud. Cloud providers typically use a "pay-as-you-go" paradigm. In accordance with aspects of the subject matter disclosed herein, operating in a cloud computing environment provides the advantage of large quantities of data for analysis. It will be appreciated that finding network patterns indicating untrustworthy behavior is enhanced by observation of network patterns accessing many different web applications on many different web servers.

System 100*b* can include one or more computing devices such as, for example, computing device 102. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102 can include one or more processors such as processor 142, etc., and a memory such as memory 144 that communicates with the one or more processors. Computing device 102 can be a web server.

System 100*b* may include one or more program modules which when loaded into the memory and accessed by the one or more processors configure the processor or processors to perform the actions attributed to the one or more program modules. System 100*b* can include a whitelisting service 105. Whitelisting service 105 can include a restricted-access URI generator 107 that receives a server log 109, and generates a list of restricted-access URIs 110. Restricted-access URI generator can filter out from URIs list of restricted-access URIs 110 URIs that have more than a provided threshold of accessors. Whitelisting service 105 can include a whitelist generator such as whitelist generator 106 that receives a server log 108 and extracts from the server log access attempts to URIs in the list of restricted-access URIs 110. Whitelist generator can remove from a collection of potential trusted accessors, accessors that accessed more than a threshold number of access-restricted URIs during a specified time period. Remaining interactions can be tagged as trusted and the IP addresses in the interactions can be included in whitelist 116 for the website.

Figure 1C:
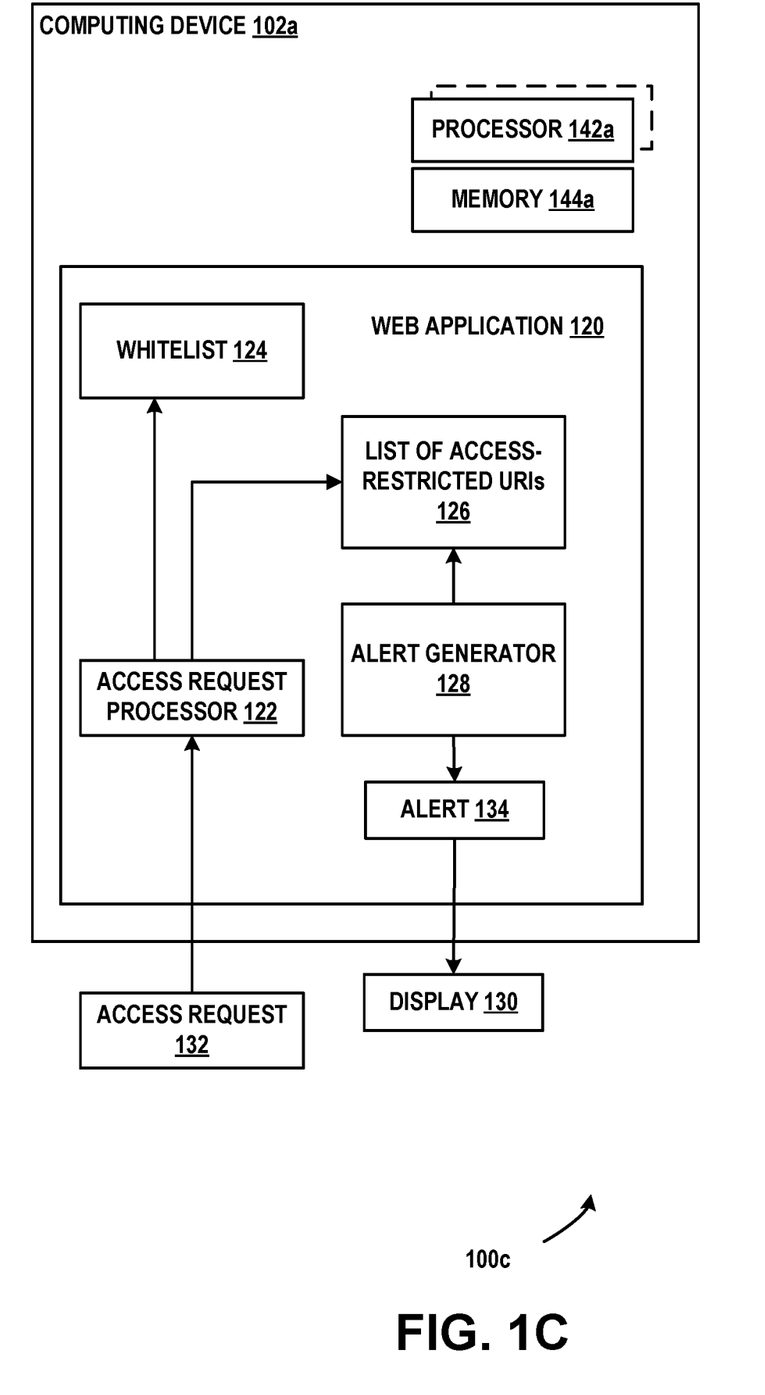
FIG. 1C is a block diagram 100c representing a system that restricts access to sensitive URIs after whitelist generation in accordance with aspects of the subject matter disclosed herein.

FIG. 1C is a block diagram representing a system 100*c* for restricting access to sensitive URIs in accordance with aspects of the subject matter disclosed herein. All or portions of system 100*c* may reside on one or more computers or computing devices such as the computers described below with respect to FIG. 3. System 100*c* or portions thereof may be provided as a stand-alone system or as a plug-in or add-in. System 100*c* or portions thereof may include information obtained from a service (e.g., in the cloud) or may operate in a cloud computing environment. Cloud computing enables access to shared pools of configurable system resources. It can also provide various services that can be set up rapidly with little effort. Sharing of resources provides economies of scale.

Cloud computing enables an entity to focus on its actual business instead of having to provide its own computer infrastructure and maintenance. A cloud computing environment can be an environment in which computing services are not owned but are provided on demand. For example, information may reside on multiple devices in a networked cloud and/or data can be stored on multiple devices within the cloud. Cloud providers typically use a "pay-as-you-go" paradigm. In accordance with aspects of the subject matter disclosed herein, operating in a cloud computing environment provides the advantage of large quantities of data for analysis. It will be appreciated that finding network patterns indicating untrustworthy behavior is enhanced by observation of network patterns accessing many different web applications on many different web servers.

System 100*c* can include one or more computing devices such as, for example, computing device 102*a*. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102*a* can include one or more processors such as processor 142*a*, etc., and a memory such as memory 144*a* that communicates with the one or more processors. Computing device 102*a* can be a web server.

System 100*c* may include one or more program modules which when loaded into the memory and accessed by the one or more processors configure the processor or processors to perform the actions attributed to the one or more program modules. System 100*c* can include a web application 120. The web application can include an access request processor 122, a whitelist 124, a list of access-restricted URIs 126 and an alert generator 128 that can display an alert 134. The alert generator 128 can display the alert 134 on a display 130 on a display device on a local or remote computer. The alert may be sent to a security center in which the owner of the website can log in to pick up alerts. The access request processor 110 can receive an access request 132 comprising an interaction that identifies the accessor by IP address and a URI or webpage in the website to be accessed. Access requests are typically stored in server logs, not shown. The access request processor 110 can receive the access request. If the URI in the access request is a URI identified as sensitive by inclusion in the list of restricted-access URIs 126, the whitelist 124 for that website can be accessed to determine if the accessor is trusted or untrusted. If the option for blocking the access request has been configured for the website, the access request can be denied. If the option for generating an alert has been configured, an alert 134 can be generated. The alert can be sent to a security center (not shown) or displayed in a display 130.

Figure 2A:
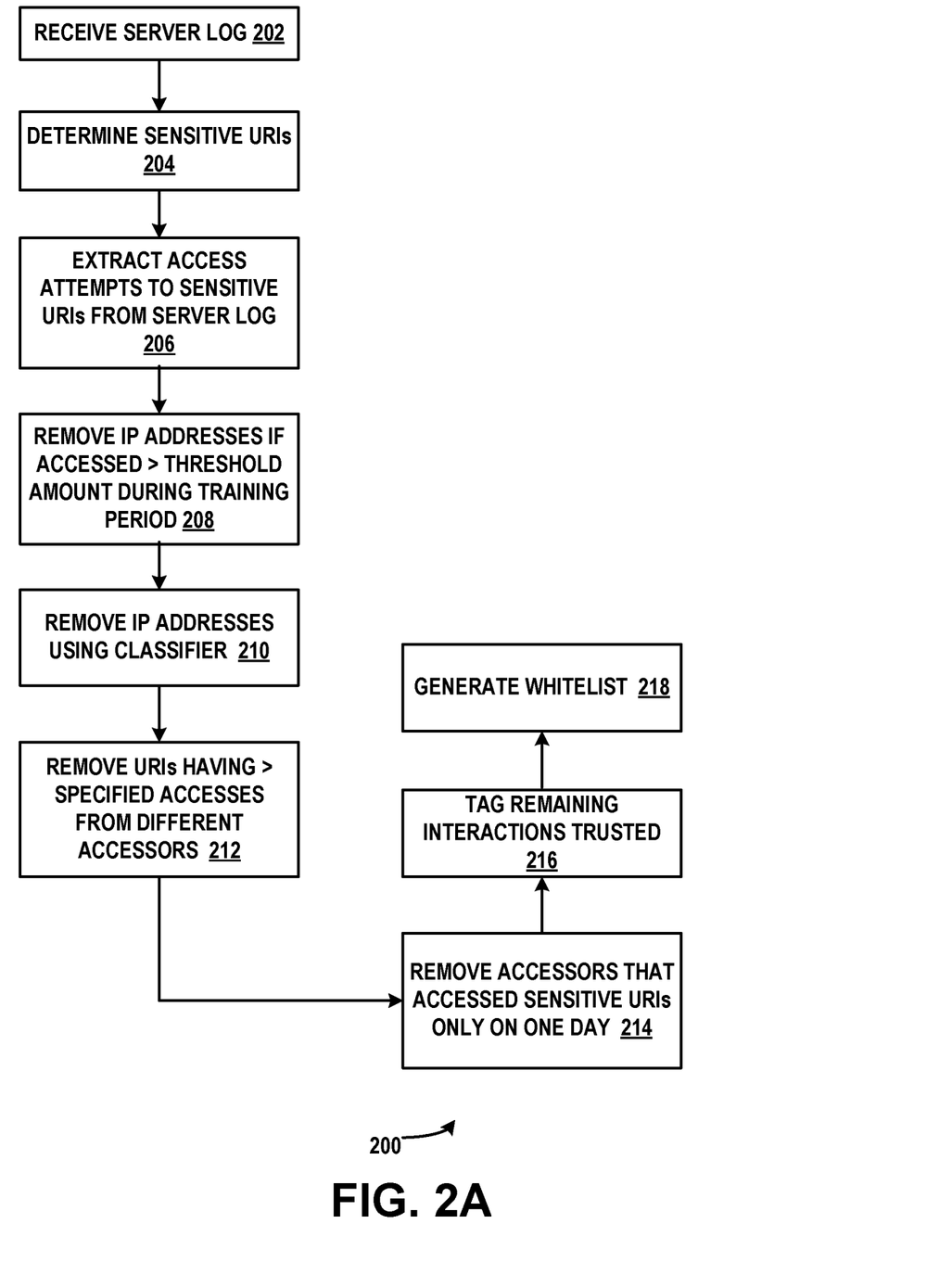
FIG. 2A illustrates an example of a method 200 for restricting access to sensitive URIs in accordance with aspects of the subject matter described herein.

FIG. 2A illustrates an example of a method 200 for whitelisting access to restricted web pages in accordance with aspect of the subject matter disclosed herein. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated. Method 200 or portions thereof may be executed by a system or a portion of a system such as system 100b as described by overview 100a.

At operation 202 one or more access requests can be received by the web server. The access requests can be stored in one or more server logs. The access requests can include the information described above. A URI training dataset can be extracted from the server logs, and can be used to train a ML system that can predict the vulnerability (sensitivity) of the URI accessed as described above to generate a list of URIs, access to which is restricted to trusted accessors included in a whitelist of trusted accessors. At operation 204 the determined sensitive URIs can be added to a data store of sensitive URIs for the website. At operation 206 access attempts to the sensitive URIs can be extracted from the server logs. At operation 208 IP addresses can be removed from potential trusted IP addresses for access attempts from IP addresses that accessed more than a specified threshold of web pages during the learning period. Alternatively or in addition to operation 208, at operation 210 IP addresses that made access attempts to a restricted page can be eliminated using a classifier and labeled data. At operation 212, URIs having more than a specified number of access attempts from different accessors can be removed from the sensitive URI list. At operation 214, access attempts from IP addresses that only occurred on one day during the training period can be filtered out. At operation 216 all remaining IP/website interactions can be tagged as trusted. At operation 218 the remaining IP addresses can be added to the whitelist for the website.

Figure 2B:
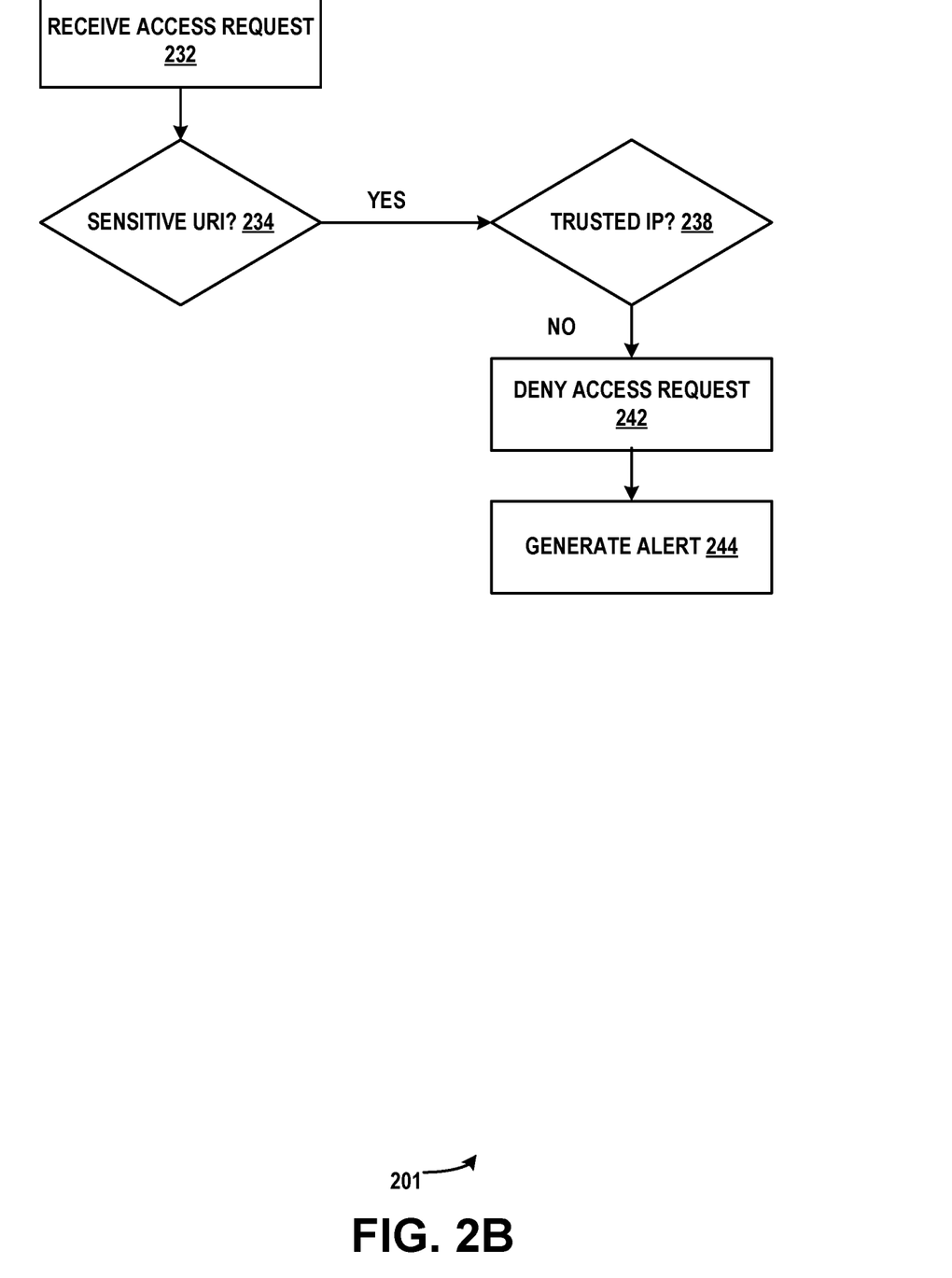
FIG. 2B illustrates an example of a method 201 for restricting access to sensitive URIs after whitelist generation in accordance with aspects of the subject matter described herein.

FIG. 2B illustrates an example of a method 201 for whitelisting access to restricted web pages in accordance with aspect of the subject matter disclosed herein. While method 201 describes a series of operations that are performed in a sequence, it is to be understood that method 201 is not limited by the order of the sequence depicted. For instance, some operations may occur in a different order than that described. In addition, one operation may occur concurrently with another operation. In some instances, not all operations described are performed. In some instances, not all operations performed are illustrated. Method 201 or portions thereof may be executed by a system or a portion of a system such as system 100c.

At operation 232 an access request can be received by a web application. At operation 234 the URI accessed in the access request can be checked for inclusion in a data store of access-restricted (sensitive) URIs for the website. In response to determining that the URI is access-restricted (included in the data store of access-restricted URIs), the IP address can be checked for inclusion in the trusted IP data store at operation 238. In response to determining that the IP address is not in the trusted IP list for the website, the access request can be denied at operation 242. An alert can be generated at operation 244.

Described herein is a computing device comprising a memory connected to at least one processor, the at least one processor configured to restrict access to sensitive web pages by determining a plurality of access-restricted URIs for a website and restricting access to the plurality of access-restricted URIs for the website to IP addresses included in a whitelist for the website based on historical data from a plurality of web servers. Historical data comprising a plurality of interactions, an interaction of the plurality of interactions comprising an access request from an accessor identified by an IP address to an access-restricted URI of the website can be received. Historical data can comprise server logs. Access-restricted URIs can be determined by manually including a known sensitive URI to a data store of access-restricted URIs. Access-restricted URIs can be determined by machine learning techniques in which webpages frequently scanned by scanners, attacked by brute force attackers, requiring username and password, or that are well-known configuration sites are identified. A scanner can be identified by a threshold, such that an accessor identified by an IP address that accessed more than a threshold number of web pages during a learning period is eliminated from a plurality of potentially trusted IP addresses for the website. An IP address in the plurality of potentially trusted IP addresses can be tagged as trusted if the IP address accessed the access-restricted webpage at least a configurable number of days in the learning period. Remaining IP addresses can be added to a whitelist of trusted IP addresses for the website.

Described herein is a computing device comprising a memory connected to at least one processor, the at least one processor configured to restrict access to access-restricted web pages by receiving an access request for a website from an accessor, the access request comprising an IP address of the accessor and a URI comprising a location of a webpage in the website being accessed, determining that the URI is an access-restricted URI and in response to determining that the accessor is not trusted, denying access to the URI. An alert can be sent to an owner of the website identifying the accessor and the access-restricted URI of the denied access request. An alert can be sent to a security center accessible by an owner of the website identifying the accessor and the access-restricted URI of the denied access request. Trusted IP addresses comprise IP addresses in a whitelist of IP addresses for the website.

Described herein is a method of restricting access to access-restricted URIs of a website comprising generating a data store of access-restricted URIs for a website from historical records from a plurality of web servers hosting a plurality of web applications, restricting access to the plurality of access-restricted URIs for the website to IP addresses included in a whitelist for the website, denying access to accessors to access-restricted URIs of the website in response to determining that an IP address of the accessor is not included in the whitelist and generating an alert identifying the accessor and the access-restricted URI of the website. The alert can be sent to a security center accessible by an owner of the website. The alert can be displayed on a display device to an owner of the website. Machine learning techniques can be used in which webpages frequently scanned by scanners, attacked by brute force attackers, requiring username and password, or that are well-known configuration sites are identified. Scanners can be identified by threshold, such that an accessor identified by an IP address that accessed more than a threshold number of web pages during a learning period is identified as a scanner. Scanners can be removed from a plurality of potentially trusted IP addresses. An IP address in the plurality of potentially trusted IP addresses can be tagged as trusted if the IP address accessed the access-restricted webpage at least a configurable number of days in the learning period. Remaining potentially trusted IP addresses can be added to the whitelist of trusted IP addresses for the website.

Example of a Suitable Computing Environment

Figure 3:
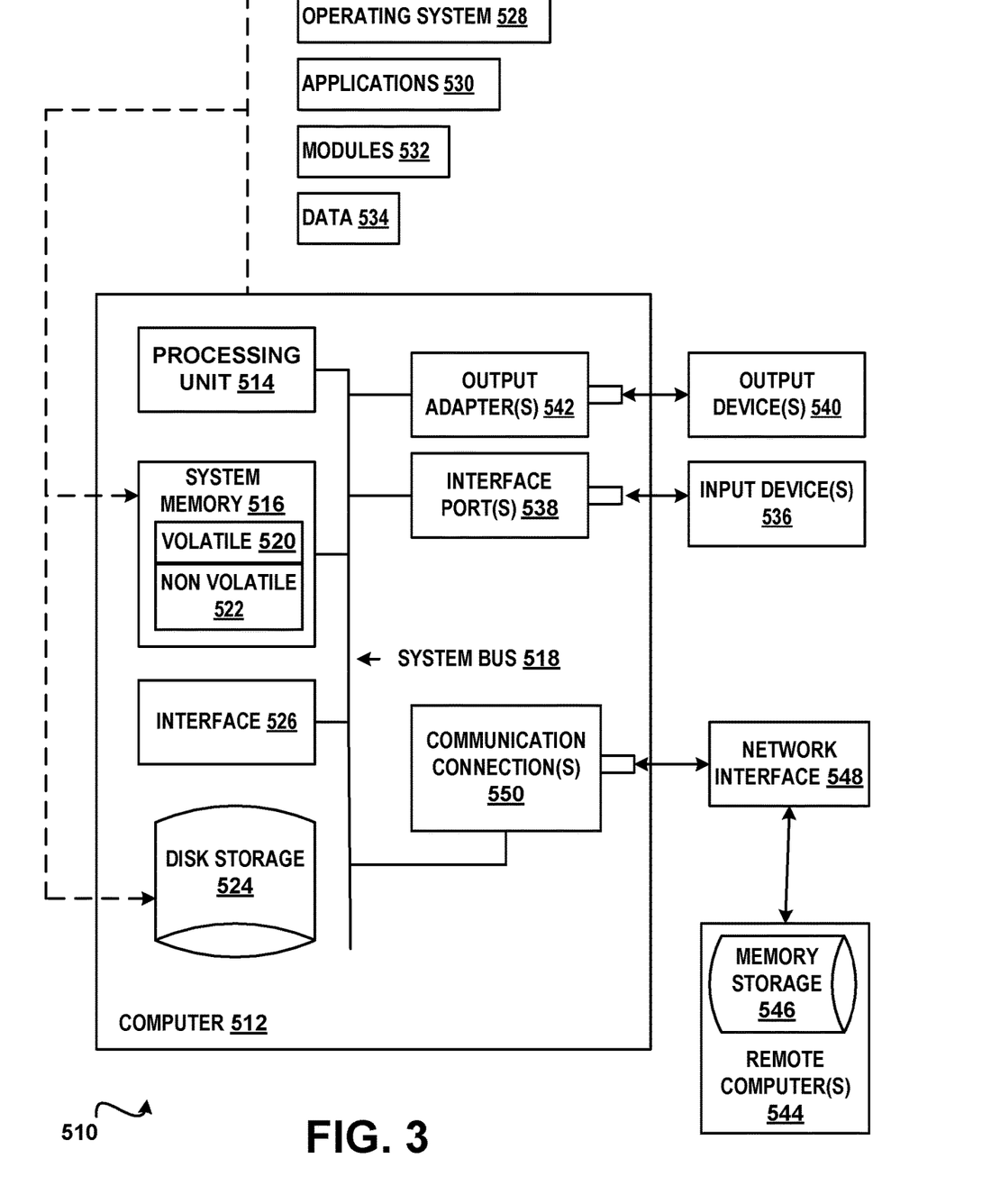
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and nonvolatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device comprising:
a memory connected to at least one processor, the at least one processor configured to:
access one or more server logs reflecting a plurality of instances where different IP addresses have accessed different access-restricted URIs;
identify a particular IP address in the one or more server logs that has previously accessed a particular access-restricted URI for a particular website on multiple previous occasions;
based at least on the particular IP address having previously accessed the particular access-restricted URI for the particular website on the multiple previous occasions, designate the particular IP address as a particular trusted IP address for the particular access-restricted URI and add the particular trusted IP address to a particular whitelist for the particular access-restricted URI; and
restrict access to the particular access-restricted URI to one or more trusted IP addresses on the particular whitelist, including at least the particular trusted IP address.

2. The computing device of claim 1, wherein the at least one processor is further configured to:
train a machine learning system using the one or more server logs to determine whether URIs are access-restricted; and
use the machine learning system to determine that the particular access-restricted URI is access-restricted.

3. The computing device of claim 2, wherein the machine learning system is trained based at least on:
first indications in the one or more server logs that first access-restricted URIs appear in a list of high-risk keywords of an operating system,
second indications in the one or more server logs that second access-restricted URIs utilize restricted-use files, and
third indications in the one or more server logs that third access-restricted URIs are identified by a particular online community as access-restricted.

4. The computing device of claim 1, wherein the processor is further configured to:
identify the particular access-restricted URI as access-restricted based at least on user input indicating that the particular access-restricted URI is a known sensitive URI.

5. The computing device of claim 1, wherein the processor is further configured to:
identify a plurality of potentially trusted IP addresses in the one or more server logs that have accessed the particular access-restricted URI during a specified time period; and
select the particular trusted IP address to populate the particular whitelist from the plurality of potentially trusted IP addresses.

6. The computing device of claim 5, wherein the processor is further configured to:
identify a scanner IP address that accessed more than a threshold number of web pages during the specified time period; and
eliminate the scanner IP address from consideration as a trusted IP address for the particular whitelist.

7. The computing device of claim 6, wherein the processor is further configured to:
after eliminating the scanner IP address from consideration, identify the particular IP address in a remainder of the plurality of potentially trusted IP addresses and designate the particular IP address as trusted based at least on the particular IP address having accessed the particular access-restricted URI on at least a configurable number of days during the specified time period.

8. The computing device of claim 7, wherein multiple IP addresses from the remainder are added to the particular whitelist.

9. A method comprising:
accessing one or more server logs reflecting a plurality of instances where different IP addresses have accessed different access-restricted URIs;

identifying a particular IP address in the one or more server logs that has previously accessed a particular access-restricted URI for a particular website on multiple previous occasions;
based at least on the particular IP address having previously accessed the particular access-restricted URI for the particular website on the multiple previous occasions, designating the particular IP address as a particular trusted IP address for the particular access-restricted URI and adding the particular trusted IP address to a particular whitelist for the particular access-restricted URI; and
restricting access to the particular access-restricted URI to one or more trusted IP addresses on the particular whitelist, including at least the particular trusted IP address.

10. The method of claim 9, further comprising:
determining that another IP address that has previously accessed the particular access-restricted URI for the particular website is not a trusted IP address using a classifier.

11. The method of claim 10, wherein the classifier is trained using labeled training data to determine whether IP addresses are trusted.

12. The method of claim 9, further comprising:
determining that another IP address that has previously accessed the particular access-restricted URI for the particular website is not a trusted IP address based at least on the another IP address having accessed more than a threshold number of URIs during a training period.

13. The method of claim 9, further comprising:
using machine learning, analyzing a plurality of webpages to identify the different access-restricted URIs based on an indication that the different access-restricted URIs include first URIs that are frequently scanned by scanners, second URIs that are frequently attacked by brute force attackers, third URIs that require a username and a password, and fourth URIs that are well-known configuration sites.

14. The method of claim 9, further comprising:
identifying a plurality of potentially trusted IP addresses in the one or more server logs that have accessed the different access-restricted URIs during a specified time period; and
selecting the particular trusted IP address to populate the particular whitelist from the plurality of potentially trusted IP addresses.

15. The method of claim 14, further comprising:
identifying a scanner IP address that accessed more than a threshold number of web pages during the specified time period; and
eliminating the scanner IP address from consideration as a trusted IP address for the particular whitelist.

16. The method of claim 15, further comprising:
after eliminating the scanner IP address from consideration, identifying the particular IP address in a remainder of the plurality of potentially trusted IP addresses and designating the particular IP address as trusted in an instance when the particular IP address accessed the particular access-restricted URI for a specified number of two or more days during the specified time period.

17. The method of claim 16, further comprising:
adding multiple IP addresses from the remainder to the particular whitelist.

18. A computer-readable storage medium storing computer-readable instructions which, when executed by a processor, cause the processor to perform acts comprising:
accessing one or more server logs reflecting a plurality of instances where a plurality of IP addresses have accessed a plurality of URIs;
identifying a particular IP address in the one or more server logs that has previously accessed a particular access-restricted URI for a particular website on multiple previous occasions;
based at least on the particular IP address having previously accessed the particular access-restricted URI for the particular website on the multiple previous occasions, designating the particular IP address as a particular trusted IP address for the particular access-restricted URI and adding the particular trusted IP address to a particular whitelist for the particular access-restricted URI; and
restricting access to the particular access-restricted URI to one or more trusted IP addresses on the particular whitelist, including at least the particular trusted IP address.

19. The computer-readable storage medium of claim 18, the acts further comprising:
performing a first filtering of the one or more server logs to extract a first subset of access-restricted URIs from the plurality of URIs, the first subset excluding a first remainder of non-access restricted URIs that are accessed more than a threshold number of times by different remote entities;
performing a second filtering of the one or more server logs to identify a second subset of IP addresses that accessed the access-restricted URIs of the first subset, the second subset excluding a second remainder of IP addresses that did not access the access-restricted URIs of the first subset;
performing a third filtering of the second subset of IP addresses to identify a third subset of IP addresses that did not access more than a specified number of URIs during a specified time period, the third subset excluding a third remainder of IP addresses that did access more than the specified number of URIs during the specified time period;
performing a fourth filtering of the third subset of IP addresses to identify a fourth subset of IP addresses that accessed the particular access-restricted URI at least a specified number of days during the specified time period, the fourth subset excluding a fourth remainder of IP addresses that did not access the particular access-restricted URI at least the specified number of days during the specified time period; and
selecting the particular trusted IP address from the fourth subset.

20. The computer-readable storage medium of claim 19, the acts further comprising:
performing the first filtering using a trained URI evaluation machine learning system that is trained to determine whether URIs are access-restricted; and
performing the second filtering, the third filtering, and the fourth filtering using a trained IP address evaluation machine learning system that is trained to identify trusted IP addresses.

* * * * *